US008068260B2

United States Patent
Baba

(10) Patent No.: US 8,068,260 B2
(45) Date of Patent: Nov. 29, 2011

(54) ORIGINAL DOCUMENT SIZE DETECTION USING A LINE SENSOR FOR READING THE ORIGINAL DOCUMENT

(75) Inventor: Hiroyuki Baba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 389 days.

(21) Appl. No.: 12/258,693

(22) Filed: Oct. 27, 2008

(65) Prior Publication Data

US 2009/0109496 A1    Apr. 30, 2009

(30) Foreign Application Priority Data

Oct. 29, 2007  (JP) ................. 2007-280094

(51) Int. Cl.
*H04N 1/40* (2006.01)

(52) U.S. Cl. ........ 358/449; 358/474; 358/497; 358/498; 355/75; 250/208.1

(58) Field of Classification Search .......... None
See application file for complete search history.

(56) References Cited

U.S. PATENT DOCUMENTS

| | | | | |
|---|---|---|---|---|
| 4,541,713 A | * | 9/1985 | Maekawa | 355/75 |
| 5,016,049 A | * | 5/1991 | Onishi et al. | 399/32 |
| 5,041,919 A | * | 8/1991 | Yamamoto et al. | 358/449 |
| 5,778,276 A | * | 7/1998 | Hasegawa | 399/17 |
| 5,973,797 A | * | 10/1999 | Tanaka et al. | 358/488 |
| 6,320,673 B1 | * | 11/2001 | Motosugi | 358/1.9 |
| 6,534,761 B2 | * | 3/2003 | Fukatsu et al. | 250/222.1 |
| 7,330,692 B2 | * | 2/2008 | Kohchi et al. | 399/376 |
| 7,471,424 B2 | * | 12/2008 | Ishido et al. | 358/449 |
| 7,558,524 B2 | * | 7/2009 | Ooshima et al. | 399/370 |
| 7,715,066 B2 | * | 5/2010 | Michiie | 358/474 |
| 7,813,010 B2 | * | 10/2010 | Michiie et al. | 358/474 |
| 2003/0038229 A1 | * | 2/2003 | Fukatsu et al. | 250/208.1 |

(Continued)

FOREIGN PATENT DOCUMENTS

JP    8-32763    2/1996

(Continued)

OTHER PUBLICATIONS

Notice of Rejection issued Jul. 19, 2011, in Japanese Patent Application No. 2007-280094.

*Primary Examiner* — King Poon
*Assistant Examiner* — Dung Tran
(74) *Attorney, Agent, or Firm* — Oblon, Spivak, McClelland, Maier & Neustadt, L.L.P.

(57) ABSTRACT

In an image reading device, a reading unit scans first rectangle regions located within a maximum reading area equivalent to a maximum size of a document that can be scanned and acquires image data from the first rectangle regions. A transporting unit moves the reading unit to the first rectangle regions in a direction of movement opposite to a direction of movement in normal document reading. A document size judging unit detects whether a document exists in each first rectangle region based on the image data acquired by the reading unit and a predetermined threshold, so that a size of the document is judged. The reading unit is arranged to scan second rectangle regions located outside the maximum reading area, the second rectangles being different from the first rectangle regions, and acquire image data from the second rectangle regions.

7 Claims, 19 Drawing Sheets

U.S. PATENT DOCUMENTS

| | | | |
|---|---|---|---|
| 2006/0028696 A1* | 2/2006 | Michiie et al. | 358/474 |
| 2006/0208157 A1* | 9/2006 | Michiie | 250/208.1 |
| 2006/0245015 A1* | 11/2006 | Ikeno et al. | 358/518 |
| 2008/0094668 A1* | 4/2008 | Matsui | 358/449 |
| 2010/0053706 A1* | 3/2010 | Jasinski et al. | 358/498 |

FOREIGN PATENT DOCUMENTS

| | | | |
|---|---|---|---|
| JP | 10221790 A * | | 8/1998 |
| JP | 2001-36695 | | 2/2001 |
| JP | 2006-67179 | | 3/2006 |
| JP | 2007-158965 | | 6/2007 |

* cited by examiner

ORIGINAL DOCUMENT SIZE DETECTION USING A LINE SENSOR FOR READING THE ORIGINAL DOCUMENT

BACKGROUND OF THE INVENTION

1. Field of the Invention

This invention relates to an image reading device and an image forming device which detect a document size using a line sensor for reading a document, instead of reflected type sensors arranged in the positions corresponding to various sizes of standard-sized documents.

2. Description of the Related Art

An image reading device, such as an image scanner, has a function which detects automatically the size of a document laid on a transparent document base, such as a contact glass. The commonly used method of detecting document size is that reflected type sensors are arranged in the positions corresponding to various sizes of standard-sized documents, and the size of a document is determined based on a combination of output signals from the sensors.

In recent years, however, for the purpose of cost reduction, a new method is adopted, and the new method is that the size of a document is detected using a line sensor for reading the document, rather than using the reflected type sensors mentioned above.

For example, Japanese Laid-Open Patent Application No. 2007-158965 discloses an image reading device in which only predetermined positions of a document placed on the contact glass are read, a black/white judgment for image data of a plurality of patches (rectangle regions) corresponding to the predetermined positions of the document is performed using the read image data of the document, and the size of the document is judged based on the results of the black/white judgment of the respective patches.

In the image reading device of Japanese Laid-Open Patent Application No. 2007-158965, the document size judgment process is performed in this way. Because it is no longer necessary to scan the whole surface of the document in order for judging the document size, the time needed for judging the document size can be shortened.

However, the document size judgment as in Japanese Laid-Open Patent Application No. 2007-158965 has a problem in that, if the pressure plate is already closed when reading the rectangle regions for document size detection, erroneous detection occurs. This is because the back surface of the pressure plate holding is optically read by the line sensor.

An approximate minimum time for the user to close the pressure plate can be predicted. However, there may be a case in which the user closes the pressure plate earlier than the predicted time. A conceivable method for preventing the problem is to shorten the time of reading of the rectangle regions for document size judgment. However, if the amount of data being read is decreased, the result of document size judgment is easily influenced by the surrounding lighting or others, which may be the factor of erroneous judgment. Thus, it is necessary to make the time of reading of the rectangle regions as long as possible and average the read image data, in order to reduce the influences of the surrounding lighting etc.

Usually, the reading of document detection is started in response to a signal output from the photo sensor which has detected an inclined state of the pressure plate in which a certain angle is made by the contact glass and the pressure plate. For this reason, it is necessary to complete the reading of the rectangle regions for document size judgment during a short period from the start timing until the pressure plate is completely closed.

However, the smaller the angle between the contact glass and the pressure plate, the larger the influence of the white sheet on the back of the pressure plate. Then, the possibility of erroneous detection becomes higher.

Moreover, the influence of the light source lamp of the image reading unit may be another problem of erroneous detection. For example, when the temperature of the environment where the image forming device is placed is low, the lighting up of the lamp may delay. Or there may be a case in which the lamp stops lighting up due to the deterioration or other factors. In such cases, erroneous detection of the document size may occur.

Accordingly, the document size judgment as in Japanese Laid-Open Patent Application No. 2007-158965 has the problem in that the user cannot recognize erroneous detection of the document size which may occur when the pressure plate is closed too early or when the lamp is not switched on normally.

SUMMARY OF THE INVENTION

In one aspect of the invention, the present disclosure provides an improved image reading device and image forming device in which the above-described problems are eliminated.

In one aspect of the invention, the present disclosure provides an image reading device which enables a user to recognize a possibility that the document size is erroneously detected due to lamp error or improper operation to close the pressure plate early.

In an embodiment of the invention which solves or reduces one or more of the above-mentioned problems, the present disclosure provides an image reading device comprising: a reading unit configured to scan first rectangle regions located within a maximum reading area equivalent to a maximum size of a document that can be scanned and acquire image data from the first rectangle regions; a transporting unit configured to move the reading unit to the first rectangle regions in a direction of movement opposite to a direction of movement in normal document reading; and a document size judging unit configured to detect whether a document exists in each first rectangle region based on the image data acquired by the reading unit and a predetermined threshold, so that a size of the document is judged, wherein the reading unit is arranged to scan second rectangle regions located outside the maximum reading area, the second rectangles being different from the first rectangle regions used by the document size judging unit, and acquire image data from the second rectangle regions.

The above-mentioned image reading device may be arranged to further comprise a pressure plate condition judging unit configured to judge an opened or closed condition of a pressure plate which presses down a document on a document base, based on image data of the second rectangle regions acquired by the reading unit.

The above-mentioned image reading device may be arranged so that the pressure plate condition judging unit is arranged to perform binarization of the image data of the second rectangle regions acquired by the reading unit, and judge the opened or closed condition of the pressure plate by comparison of a resulting binary image data and a predetermined threshold.

The above-mentioned image reading device may be arranged to further comprise a first warning unit configured to output, when it is judged by the pressure plate condition judging unit that the pressure plate is in an opened condition, to a user a warning message indicating that there is a possibility that the document size judged by the document size judging unit is not correct.

The above-mentioned image reading device may be arranged so that the reading unit is arranged to scan two rectangle regions located outside the maximum reading area and acquire image data from the two rectangle regions, the pressure plate condition judging unit is arranged to judge the opened or closed condition of the pressure plate based on the image data of the two rectangle regions acquired by the reading unit; the image reading device further comprising a threshold switching unit configured to change a value of the threshold used by the document size judging unit according to a result of the judgment by the pressure plate condition judging unit such that the value of the threshold is set to a first value when the pressure plate is judged as being in a closed condition, and the value of the threshold is set to a second value when the pressure plate is judged as being in an opened condition.

The above-mentioned image reading device may be arranged to further comprise a lamp lighting condition determining unit configured to determine a lighting condition of a lamp illuminating a document, based on image data of the second rectangle regions acquired by the reading unit.

The above-mentioned image reading device may be arranged so that the lamp lighting condition determining unit is arranged to perform binarization of the image data of the second rectangle regions acquired by the reading unit, and determine whether the lamp is in a normal lighting condition by comparison of a resulting binary image data and a predetermined threshold.

The above-mentioned image reading device may be arranged to further comprise a second warning unit configured to output, when it is determined by the lamp lighting condition determining unit that the lamp is not in the normal lighting condition, to a user a warning message indicating that there is a possibility that the document size judged by the document size judging unit is not correct.

In an embodiment of the invention which solves or reduces one or more of the above-mentioned problems, the present disclosure provides an image forming device in which an image reading device is arranged, the image reading device comprising: a reading unit configured to scan first rectangle regions located within a maximum reading area equivalent to a maximum size of a document that can be scanned and acquire image data from the first rectangle regions; a transporting unit configured to move the reading unit to the first rectangle regions in a direction of movement opposite to a direction of movement in normal document reading; and a document size judging unit configured to detect whether a document exists in each first rectangle region based on the image data acquired by the reading unit and a predetermined threshold, so that a size of the document is judged, wherein the reading unit is arranged to scan second rectangle regions located outside the maximum reading area, the second rectangles being different from the first rectangle regions used by the document size judging unit, and acquire image data from the second rectangle regions.

According to the image reading device of the embodiment of the invention, when a document size is erroneously detected due to lamp error or improper operation to close the pressure plate early, the user can recognize the erroneous detection of the document size.

Other objects, features and advantages of the present invention will become more apparent from the following detailed description when read in conjunction with the accompanying drawings.

DETAILED DESCRIPTION OF THE PREFERRED EMBODIMENTS

A description will be given of embodiments of the invention with reference to the accompanying drawings.

Figure 1:
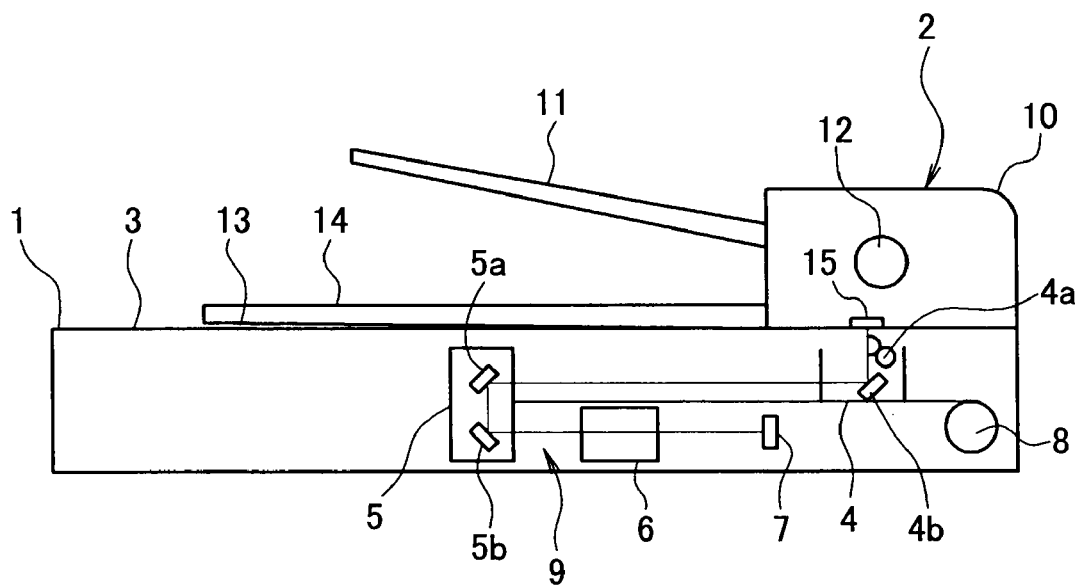
FIG. 1 is a diagram showing the outline composition of an image reading device of an embodiment of the invention.

FIG. 1 is a diagram showing the outline composition of the image reading device of an embodiment of the invention. The image reading device of this embodiment constitutes a part of a color MFP (multi-function peripheral).

The structure of components of the color MFP (a writing unit, an optical image forming unit, etc.) other than the image reading device of this embodiment will be described later.

The image reading device of this embodiment includes three major components: an image reader 1; a document transport device 2; and a document reading stand 3.

Arranged inside the image reader 1 are: a first moving body 4 provided with a light source 4a made of a xenon lamp or a fluorescent lamp, and a mirror 4b; a second moving body 5 provided with mirrors 5a and 5b; a lens 6; a one-dimensional photoelectric transducer 7 (which is, in this example, a color-reading, three-line CCD (charge coupled device)); and an exposure scanning optical system 9 provided with a stepping motor 8 for driving the first moving body 4 and the second moving body 5.

In the document transport device 2, an SDF (Sheet Document Feeder) unit 10 and a document base 11 are arranged. The SDF unit 10 includes a stepping motor 12 for transporting a document.

A document retaining plate 14 is rotatably attached to the upper part of the document reading stand 3. A document 13 is laid on the document reading stand 3 under the document retaining plate 14. At an end portion of the document reading stand 3, a reference white plate 15 for shading correction is arranged.

Figure 2:
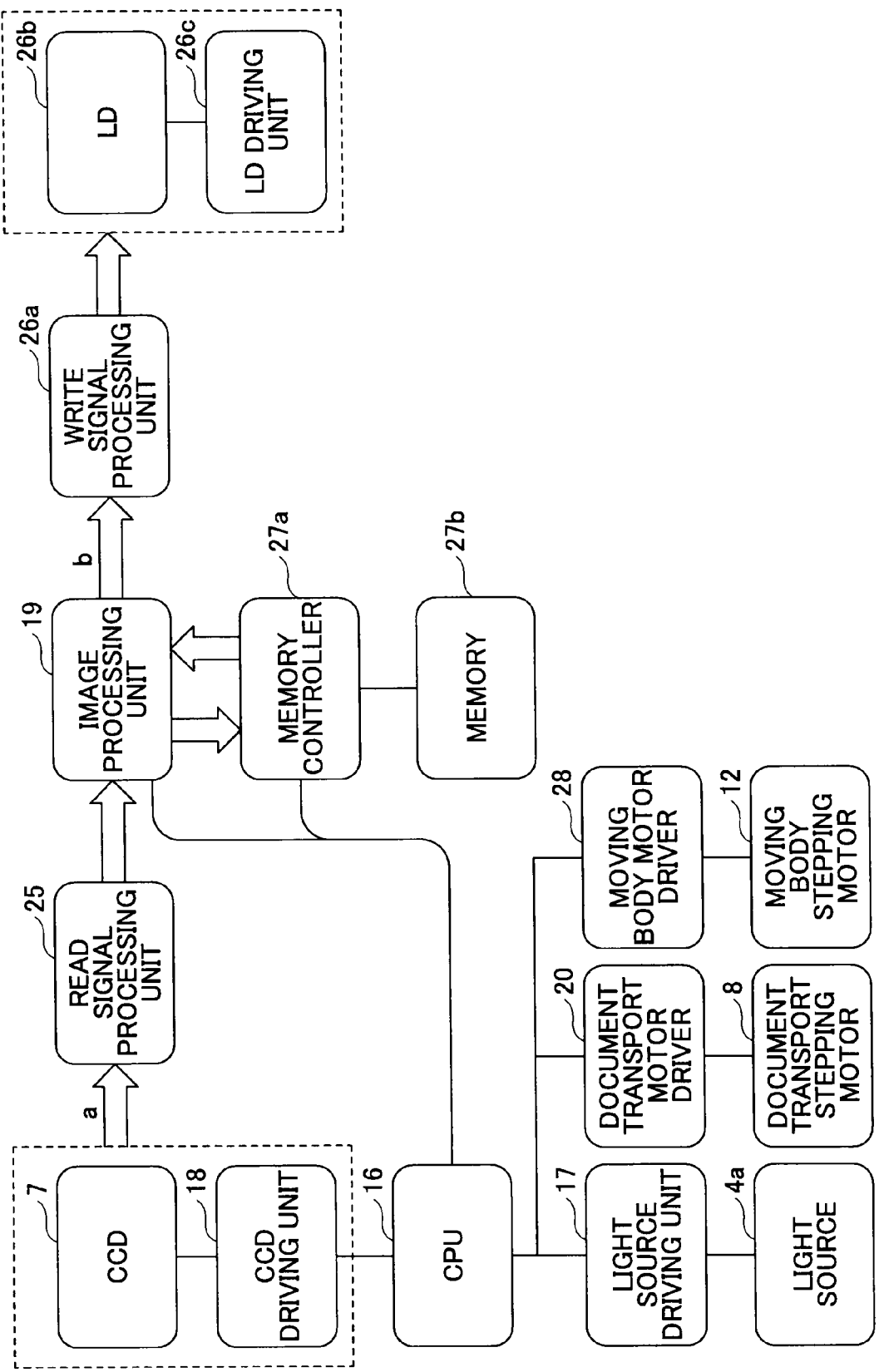
FIG. 2 is a block diagram showing the outline composition of an electrical control unit of the image reading device of the embodiment of the invention.

FIG. 2 is a block diagram showing the composition of an electrical control unit of the image reading device of this embodiment.

The electrical control unit of the image reading device of this embodiment includes a light source 4a, a CCD 7, a document transport stepping motor 8, a document transport motor driver 20, a moving body stepping motor 12, a moving body motor driver 28, a CPU 16, a light source driver 17, a CCD driving unit 18, a read signal processing unit 25, an image processing unit 19, a memory 27b, a memory controller 27a, a write signal processing unit 26a, an LD (laser diode) 26b, and a LD driving unit 26c.

Figure 3:
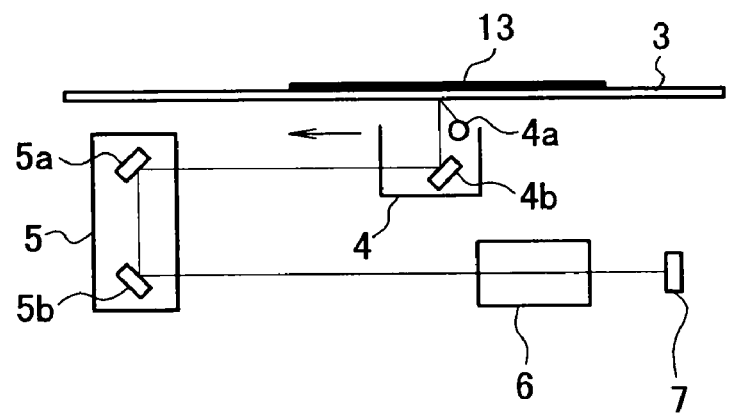
FIG. 3 is a diagram for explaining operation of the image reading device of the embodiment of the invention in a pressure plate reading mode.
Figure 4:
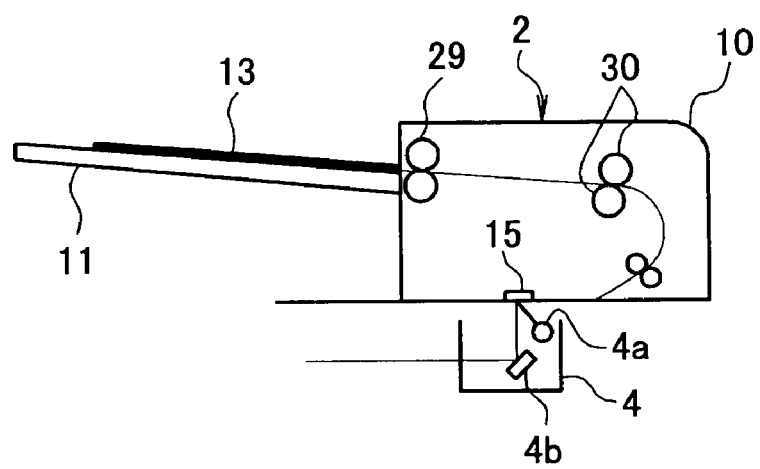
FIG. 4 is a diagram for explaining operation of the image reading device of the embodiment of the invention in a document transport reading mode.

FIG. 3 is a diagram for explaining the operation of the image reader in a pressure plate reading mode, and FIG. 4 is a diagram for explaining the operation of the image reader in a document transport reading mode.

The image reader has two document reading modes: the pressure plate reading mode which reads image data using the document reading stand 3 as shown in FIG. 3; and the document transport reading mode which moves the document itself by using the document transport device 2, and reads image data from the document at a fixed reading position as shown in FIG. 4.

With reference to FIG. 3, the operation of the image reading device in the pressure plate reading mode will be described.

After the document 13 is placed on the document reading stand 3 under the document retaining plate 14, the CPU 16 causes the light source driver 17 to turn ON the light source 4a. Next, the reference white plate 15 is scanned and read by using the CCD 7 driven by the CCD driving unit 18. By using the A/D (analog-to-digital) converter (not shown) in the image processing unit 19, analog-to-digital conversion of the image data is performed, and the read signal processing unit 25 stores the resulting digital data as white reference data for shading correction into the RAM (random access memory) for the shading correction processing (which constitutes a line buffer 36 shown in FIG. 6) in the image processing unit 19.

The CPU 16 causes the moving body motor driver 20 to operate the moving body stepping motor 8, so that the first moving body 4 is moved in the direction toward the document 13. When the first moving body 4 scans a document surface at a constant speed, photoelectric conversion of the image data of the document 13 is performed by the CCD 7.

Next, the operation of the image reading device in the document transport reading mode will be described with reference to FIG. 4. Unlike the pressure plate reading mode wherein the document is fixed and scanned by the moving body to read the image data, in the sheet-through reading (or the document transport reading mode), the moving body stays at a fixed position and the document itself is moved to read the image data by the moving body.

In the document transport reading mode, the CPU 16 of the image reading device scans and reads the reference white plate 15 by a fixed amount of movement of the first moving body 4, similar to the pressure plate reading mode. After this, the first moving body 4 is moved to the sheet-through document read position and made to stand there.

Next, the CPU 16 drives the document transport stepping motor 12 through the document transport motor driver 28, in order to convey the document 13. The document 13 which is set on the document base 11 is conveyed by the separation roller 29 and the transport roller 30 to the predetermined read position where the first moving body 4 is stopped.

At this time, the document 13 is conveyed at a constant speed, and, while the first moving body 4 is stopped, the photoelectric conversion of the image data from the document surface is performed by the CCD 7.

Figure 5:
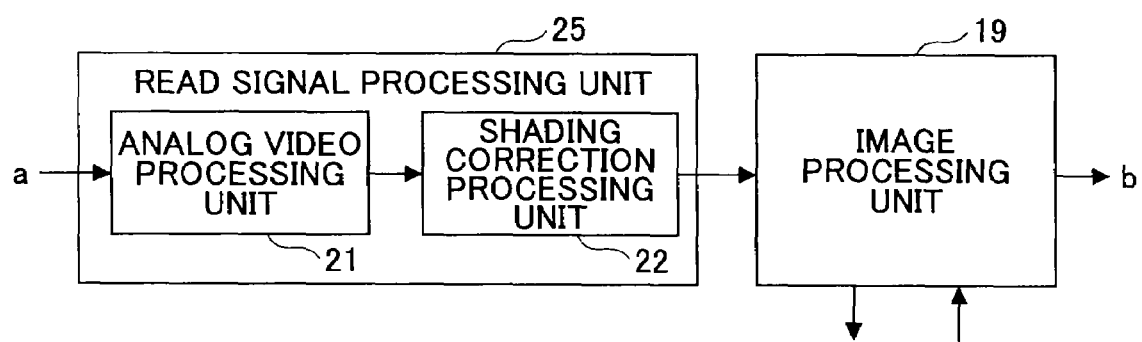
FIG. 5 is a block diagram showing the detailed composition of the electrical control unit of the image reading device of the embodiment of the invention.

FIG. 5 is a block diagram showing the composition of the read signal processing unit 25 shown in FIG. 2. The read signal processing unit 25 of FIG. 5 includes an analog video-processing unit 21 and a shading correction processing unit 22, and outputs the read data to the image processing unit 19.

An analog video signal a after the photoelectric conversion is performed is input to the analog video-processing unit 21 so that the input analog video signal a is converted to a digital video signal by the analog video-processing unit 21. The digital video signal is input to the shading correction processing unit 22 so that a shading correction process of the input digital video signal is performed by the shading correction processing unit 22.

Then, the image data after the shading correction processing is input to the subsequent-stage image processing unit 19 for various kinds of image processing.

Figure 6:
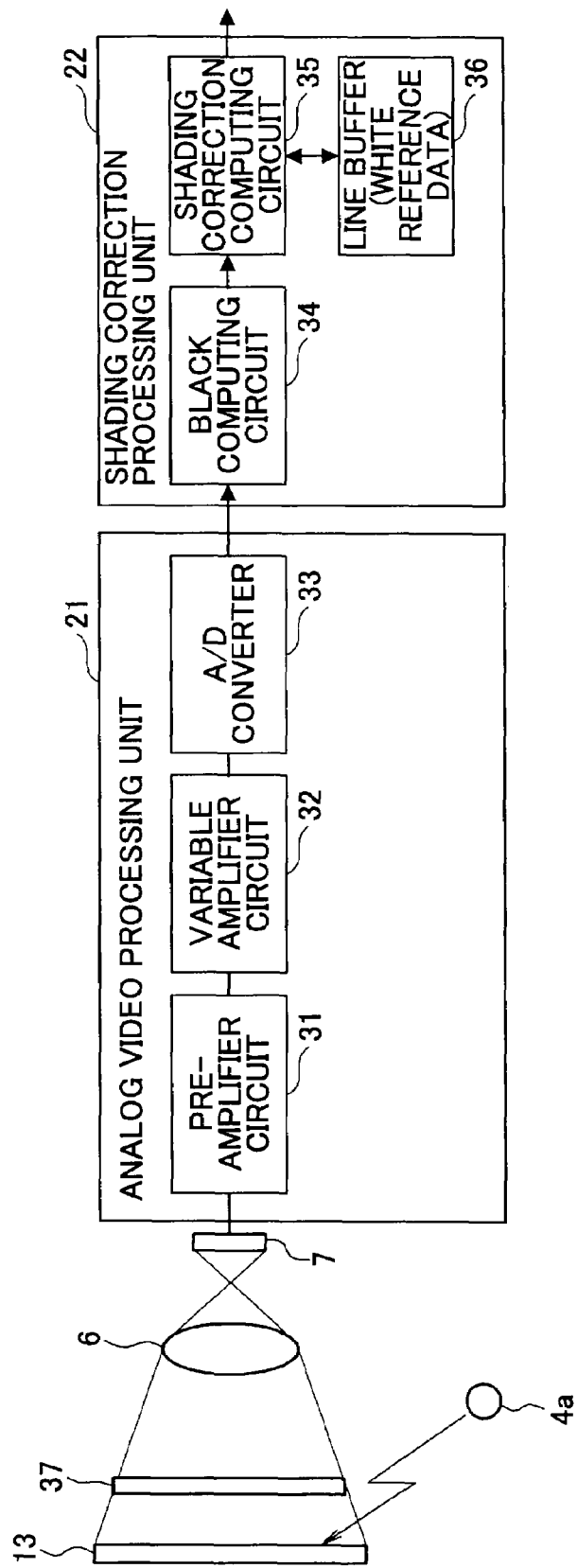
FIG. 6 is a block diagram showing the detailed composition of the electrical control unit of the image reading device of the embodiment of the invention.

As shown in FIG. 6, the analog video-processing unit 21 includes a preamplifier circuit 31, a variable amplifier circuit 32, and an A/D converter 33. The shading correction processing unit 22 includes a black computing circuit 34, a shading correction computing circuit 35, and a line buffer 36. The line buffer 36 holds the above-mentioned white reference data which serve as criteria for shading correction.

The reflected light from the document 13 on the document reading stand 3 illuminated by the light source 4a passes through the shading adjustment board 37, and the resulting light is focused onto the CCD 7 by the lens 6.

The shading adjustment board 37 serves to adjust the quantity of the input light for reducing the difference in the reflected light quantity between at the central part and at the end part of the CCD 7. If the difference in the reflected light quantity between at the central part and at the end part of the CCD 7 is too large, the result of computation obtained by the shading correction processing unit 22 may include a significant amount of distortion. To avoid this, the difference of the reflected light quantity is reduced prior to the computation, and then the computation of the shading correction processing is performed.

In FIG. 6, the mirror for turning up the reflected light is omitted for the sake of simplification of description.

Figure 7:
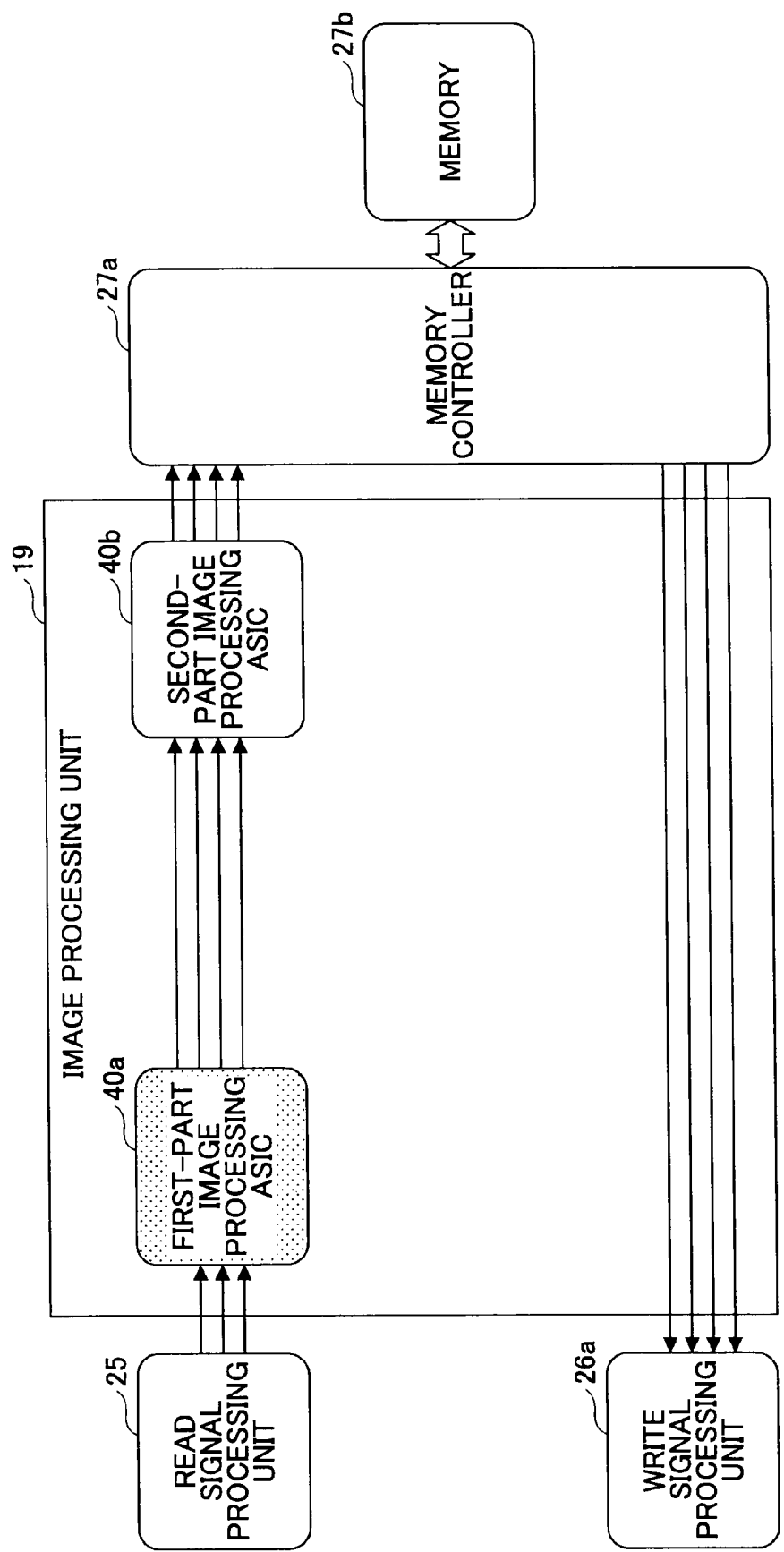
FIG. 7 is a block diagram showing the detailed composition of the electrical control unit of the image reading device of the embodiment of the invention.

The image processing unit 19 shown in FIG. 5 includes a first-part image-processing ASIC (application-specific integrated circuit) 40a and a second-part image-processing ASIC 40b as shown in FIG. 7.

Figure 8:
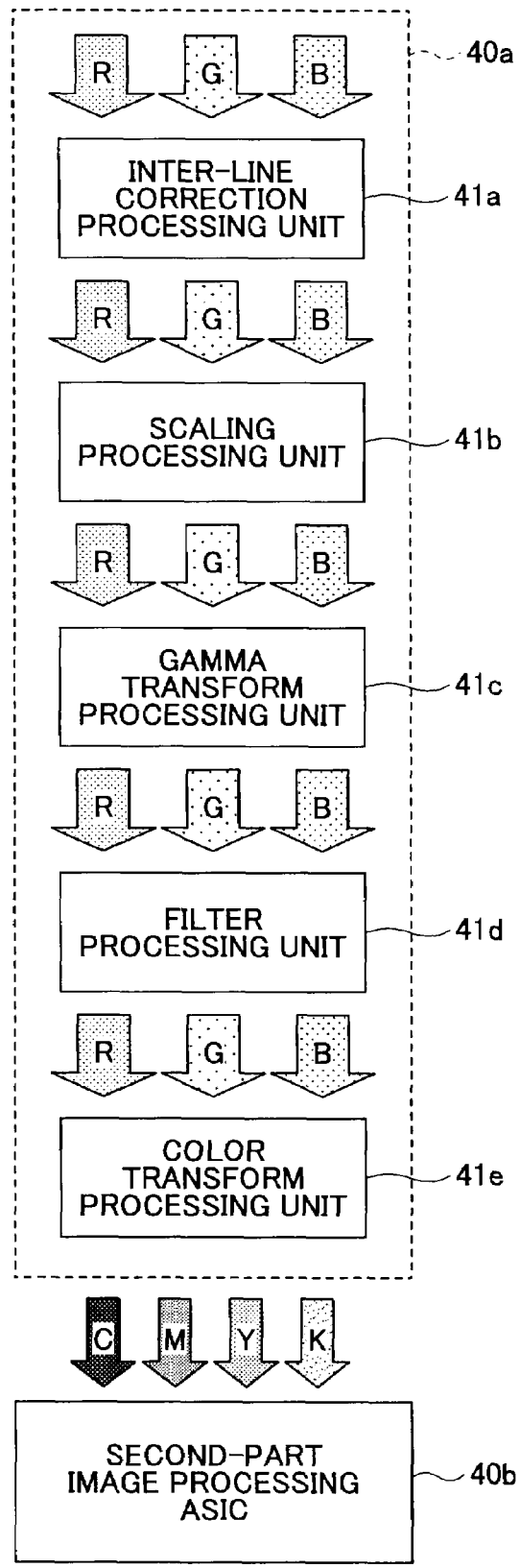
FIG. 8 is a diagram for explaining the image processing which is performed by the image reading device of the embodiment of the invention.

As shown in FIG. 8, the first-part image-processing ASIC 40a includes an inter-line correction processing unit 41a, a scaling processing unit 41b, a gamma transform processing unit 41c, a filter processing unit 41d, and a color transform processing unit 41e, and performs various processing by the respective processing units.

The inter-line correction processing unit 41a performs processing which corrects the line gap between RGB produced due to the difference of the mounting positions of RGB in the CCD 7. For example, the line of B (blue) is set to the reference line, and the amount of line gap between R (red) and B, and the amount of line gap between G (green) and B are corrected.

Figure 10:
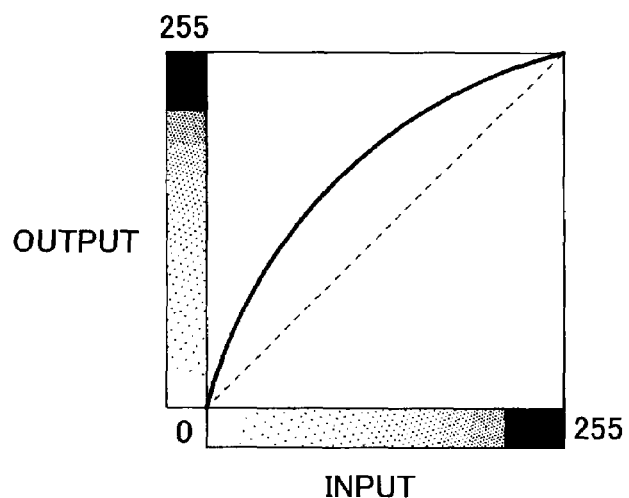
FIG. 10 is a diagram for explaining the image processing which is performed by the image reading device of the embodiment of the invention.
Figure 11:
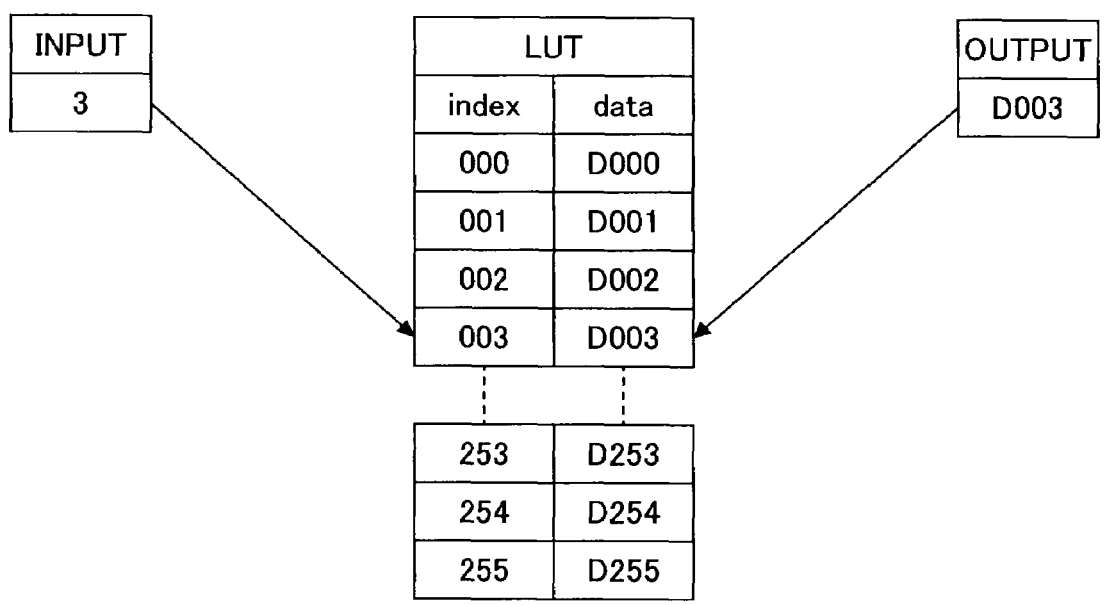
FIG. 11 is a diagram for explaining the image processing which is performed by the image reading device of the embodiment of the invention.
Figure 12:
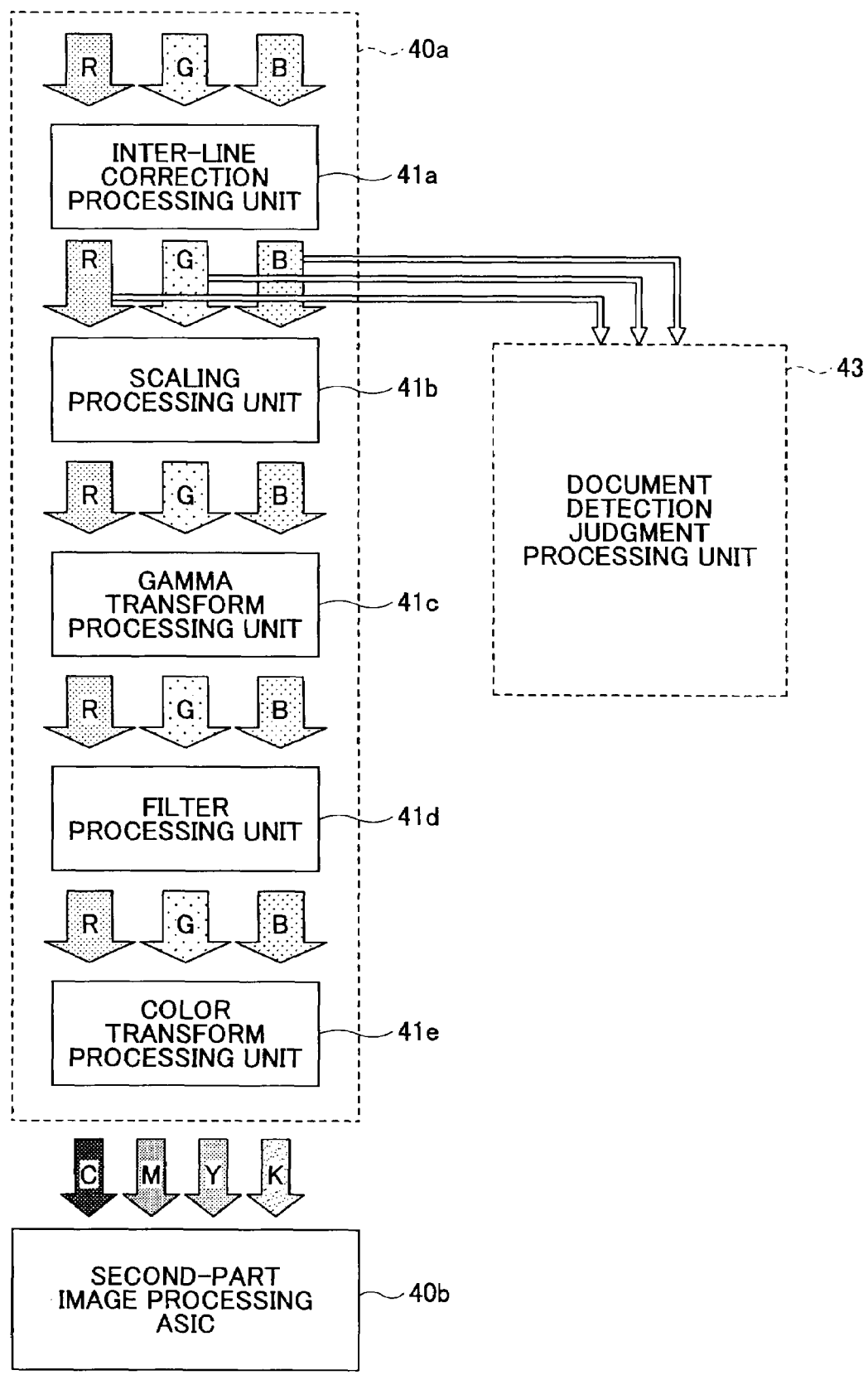
FIG. 12 is a diagram for explaining the image processing and document detection processing which is performed by the image reading device of the embodiment of the invention.

The scaling processing unit 41b performs processing which changes the resolution of reading to a desired resolution. The gamma transform-processing unit 41c performs processing which is aimed for optical density adjustment (for example, the optical density adjustment as shown in FIG. 10), and the look-up table conversion as shown in FIG. 11 is used.

The filter processing unit 41d performs the filtering operation which is aimed for MTF (modulation transfer function) compensation, edge emphasizing, and smoothing. The color transform processing unit 41e performs processing which is aimed for transforming the color space of the input image data into the color space of the output device (for example, the CMYK color space). In the case of a color image, the above-mentioned processing is performed for the respective RGB components. In the case of a monochrome image, the above-mentioned processing is performed for only one component using the G data path.

Usually, when performing the processing by the second-part image-processing ASIC 40b before data accumulation, the setting is performed to reduce the number of gradation levels to save the storage capacity for data accumulation. In this example, the binary gray-scale transform processing is selected.

Next, the gray-scale transform processing in the case of fixed threshold binarization when the writing device is capable of outputting a 1-bit signal (up to two gradation levels) will be explained.

Figure 9:
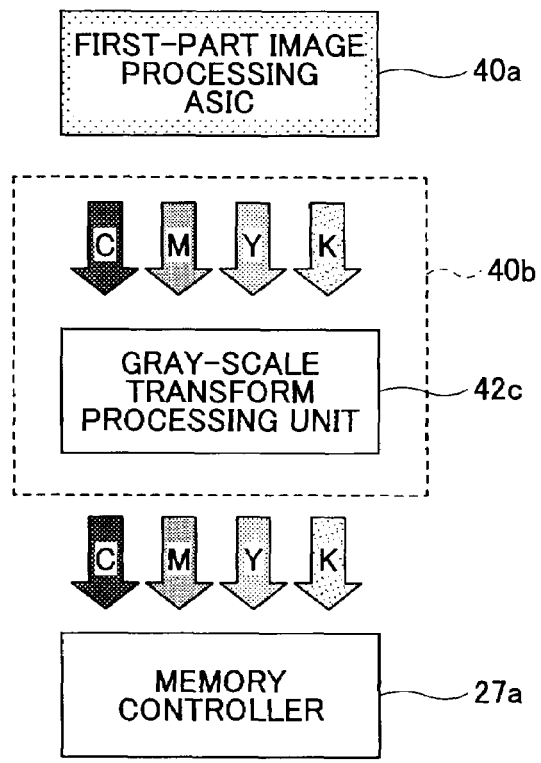
FIG. 9 is a diagram for explaining the image processing which is performed by the image reading device of the embodiment of the invention.

When a binary image is selected, as shown in FIG. 9, by the gray-scale transform processing unit 42c of the second-part image-processing ASIC 40b, each image data of CMYK of 8 bits with 256 gradation levels is changed into a binary image data with 2 gradation levels, and the image data is sent to the subsequent-stage part (the memory controller 27a) as the image data b.

For the sake of convenience of description, an example of the fixed threshold binarization processing is described. Suppose that a binarization threshold is set to 128. In this example, the binarization is performed for the pixel data of the input image of the processing unit in accordance with the following conditions.

The output is 0 if $0 \leqq$ pixel data$<128$ is truth.
The output is 1 if $128 \leqq$ pixel data$\leqq 255$ is truth.

Next, the gray-scale transform processing in the case of fixed threshold processing when the writing device is capable of outputting a 2-bit signal (up to four gradation levels) will be explained.

When a 4-level image is selected, as shown in FIG. 9, by the gray-scale transform processing unit 42c of the second-part image-processing ASIC 40b, each image data of CMYK of 8 bits with 256 gradation levels is changed into a 4-level image data with 4 gradation levels, and the image data is sent to the subsequent-stage part (the memory controller 27a) as the image data b.

For the sake of convenience of description, an example of the fixed threshold processing is described. In this example, the 4-level binarization is performed for the pixel data of the input image of the processing unit in accordance with the following conditions.

The output is 0 if $0 \leqq$ pixel data$<64$ is truth.
The output is 1 if $64 \leqq$ pixel data$<128$ is truth.
The output is 2 if $128 \leqq$ pixel data$<192$ is truth.
The output is 3 if $192 \leqq$ pixel data$\leqq 255$ is truth.

The above-mentioned image data are image data of 1 or 2 bits of one of CMYK before performing the gray-scale transform processing. The image data are temporarily stored in the memory 27b through the memory controller 27a.

The write signal processing unit 26a performs signal processing for the image data after the gradation processing is performed to generate a write signal which enables the laser diode (LD) in the writing unit to output a laser beam for forming an image. The write signal processing unit 26a performs the PWM (pulse width modulation) modulation for the processed image data after the gradation processing, so that a writing pulse signal is generated to enable the laser diode (LD) in the writing unit to output a laser beam for forming an image on the photoconductor.

The LD driving unit 26c causes the LD 26b to output a laser beam in accordance with the writing pulse signal modulated according to the image data, so that an image is formed on the photoconductor (not shown).

Next, the operation of the document detection according to the related art will be described.

In the following, the operation of the document detection using the CCD line sensor will be described. Alternatively, the operation may be performed using a CIS (contact image sensor) or another sensor using photoelectric conversion, rather than using the CCD line sensor.

Figure 13:
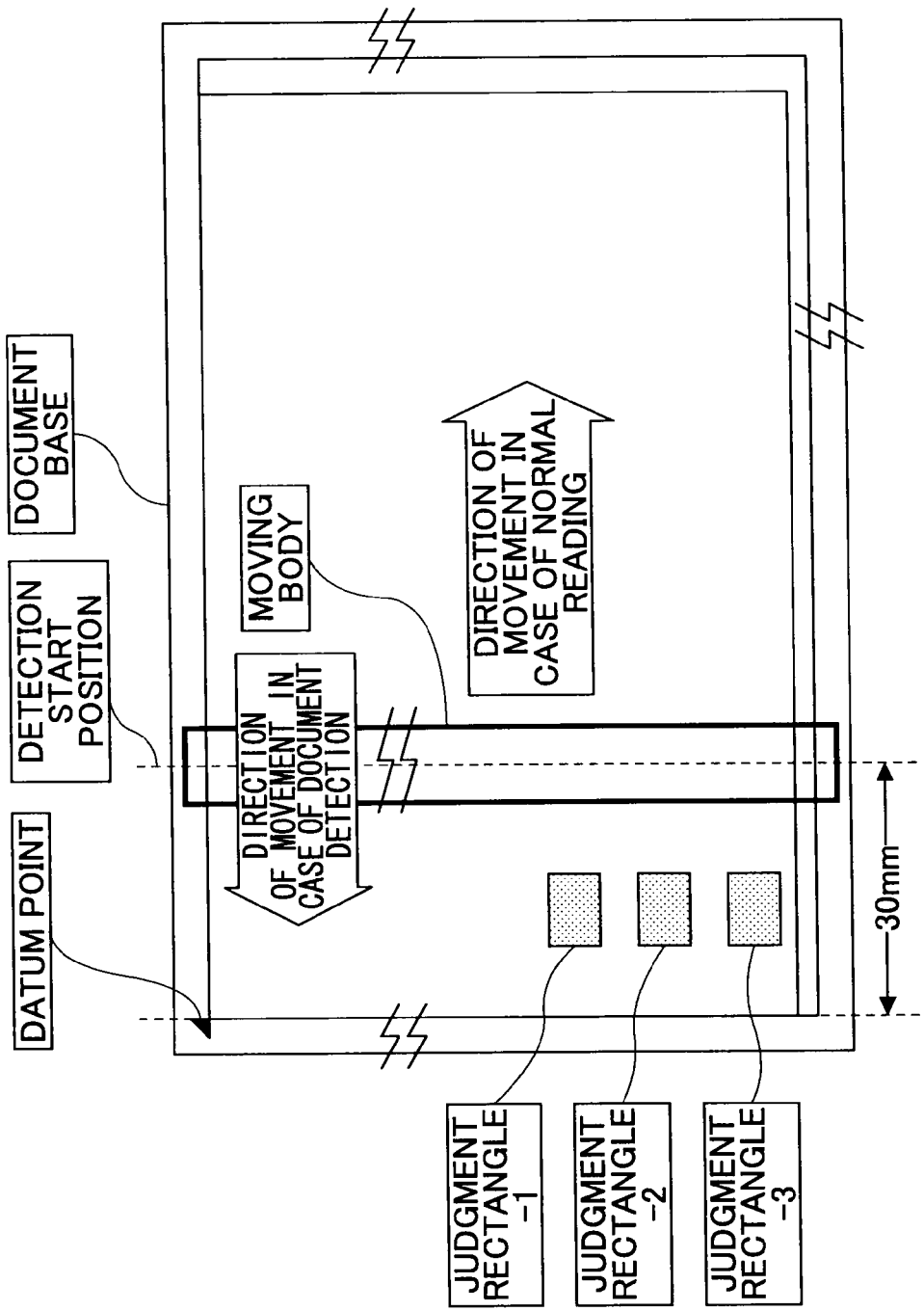
FIG. 13 is a diagram for explaining the document detection processing which is performed by the image reading device of the embodiment of the invention.

FIG. 13 is a diagram for explaining the operation of the document size detection according to the related art. First, it is detected that the pressure plate is about to be closed, by using a pressure plate opened/closed condition sensor (not shown) which detects whether the inclined angle between the pressure plate and the contact glass reaches a predetermined angle (for example, 30 degrees).

When the output signal of the sensor indicating that the inclined angle between the pressure plate and the contact glass reaches 30 degrees is valid, the moving body of the scanner unit starts movement in the direction from the document reading position to the home position (the left direction in FIG. 13). The direction of the movement for document size detection at this time is opposite to the direction of the movement for the normal reading operation. Before the pressure plate is completely closed (before returning to the home position), the areas of the judgment rectangles at specified positions are optically read by the line sensor.

Moreover, when the reading start button of the operation panel is pressed even if the inclined angle of the pressure plate does not reach the predetermined angle, the moving body of the scanner unit starts the movement in the direction from the document reading position to the home position (the left direction in FIG. 13), and reads the areas of the judgment rectangles at the specified positions. The judgment rectangles at the specified positions are arranged as shown in FIG. 13 (the judgment rectangles 1-3).

Figure 14:
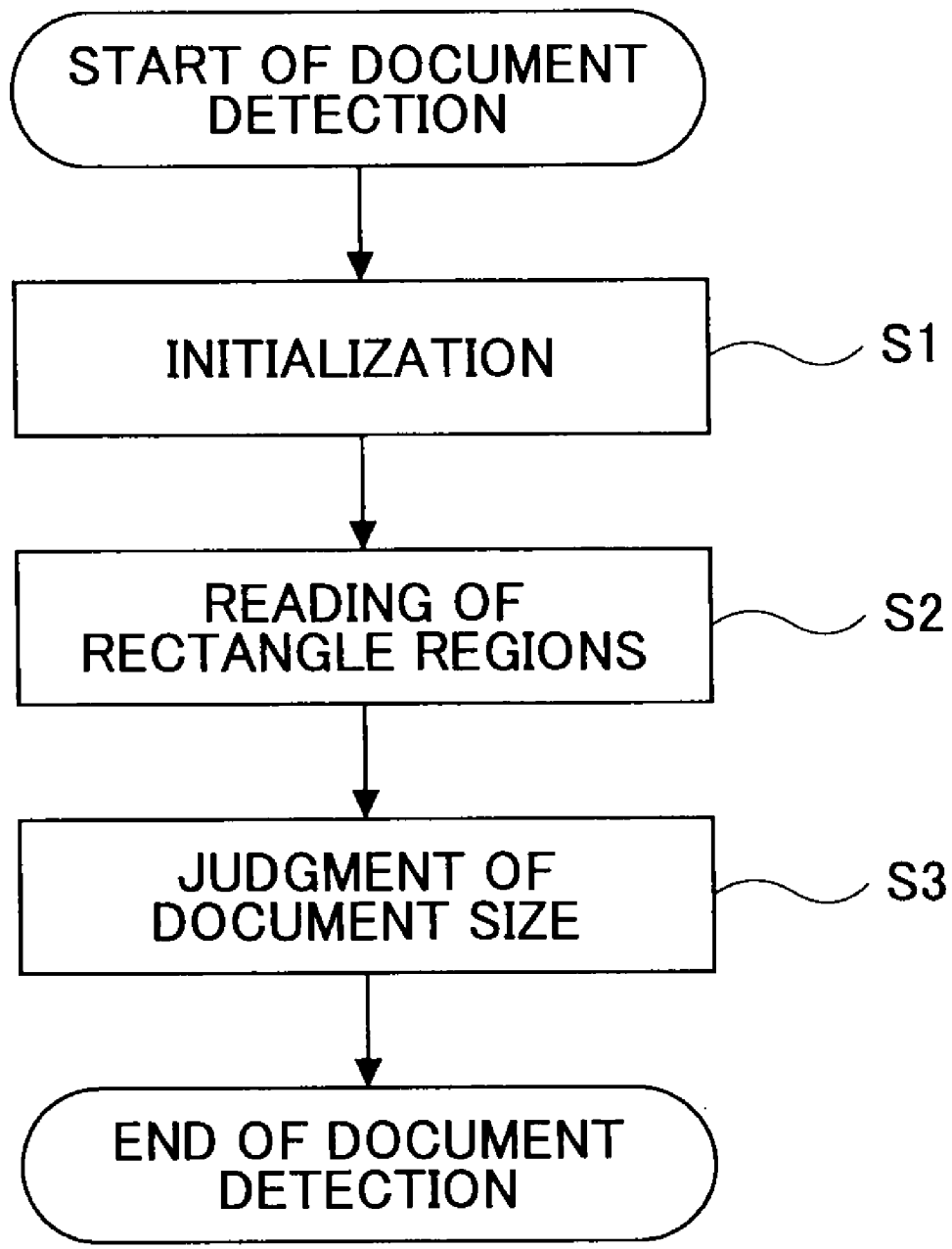
FIG. 14 is a flowchart for explaining the document detection processing which is performed by the image reading device of the embodiment of the invention.

FIG. 14 is a flowchart for explaining the whole document detection processing which is performed by the image reading device of the embodiment of the invention.

In the document detection processing of FIG. 14, first, the initial setting of the image reading device for detection is performed (step S1, initialization). Subsequently, the rectangle regions used for detecting a document size are read (step S2, reading of rectangle regions).

In this example, the case where image data of the whole rectangle region is stored in the memory will be considered. In this case, the averages of the image data are computed after the reading of the rectangle regions is performed, and the judgment of the document size is performed based on the results of the computed averages (step S3, document detection judgment).

When the line serial processing is performed, the computation of the average is performed concurrently with the reading of the rectangle region, and the final judgment of document size is performed at an end of the reading of the rectangle regions.

Next, the detailed flow of the document detection processing will be described.

Figure 16:
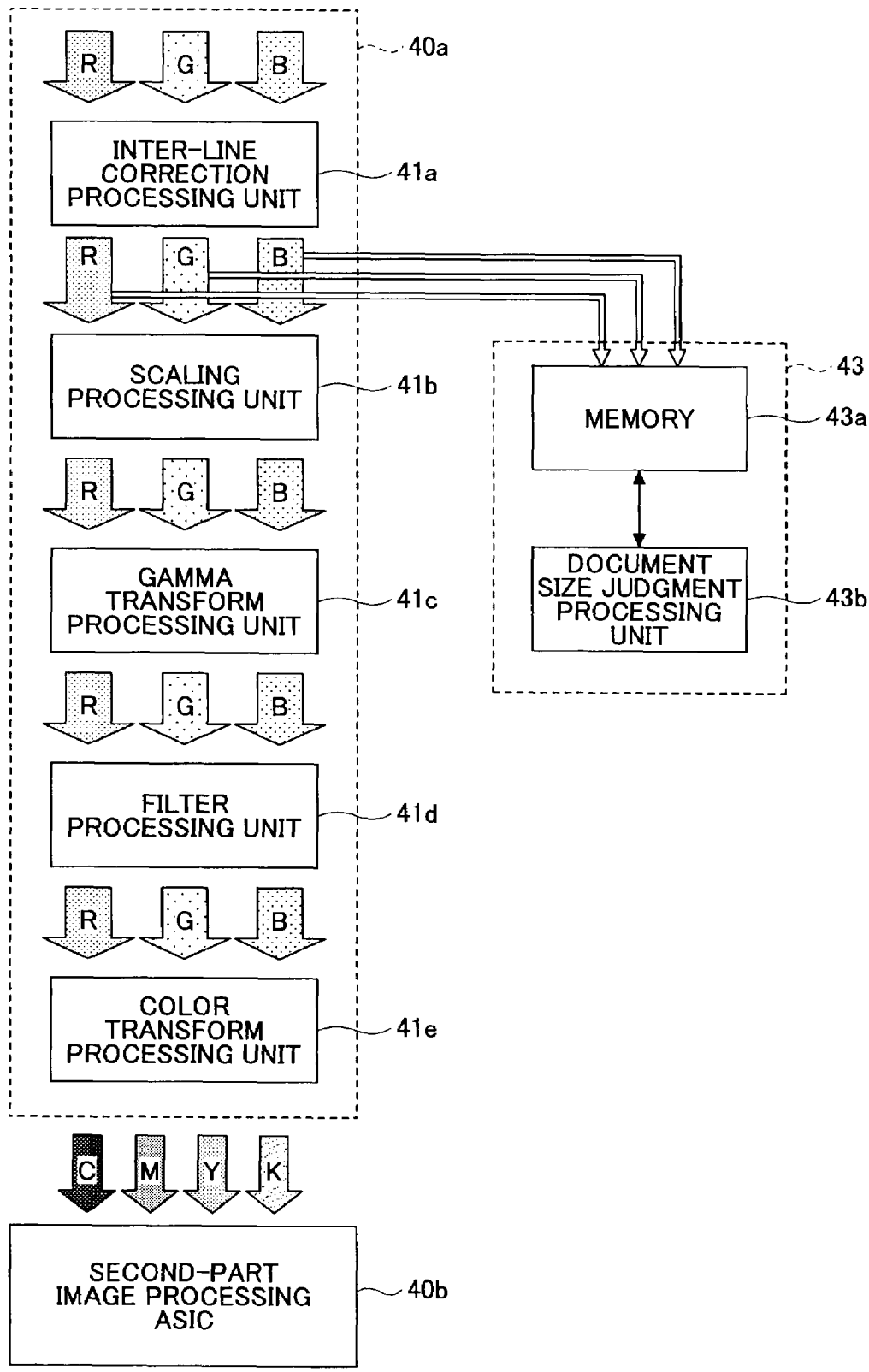
FIG. 16 is a diagram for explaining the image processing and document detection processing which is performed by the image reading device of the embodiment of the invention.

First, the line delays of R, G, and B of the read image data are corrected by the inter-line correction processing unit 41a, and the resulting image data are supplied to the document detection judgment processing unit 43. At this time, as shown in FIG. 16, the read image data of the rectangle regions (patches) are temporarily stored in the memory 43a, and the judgment of the document size with respect to the stored image data is performed by the document judgment processing unit 43b of the document detection judgment processing unit 43.

Figure 15:
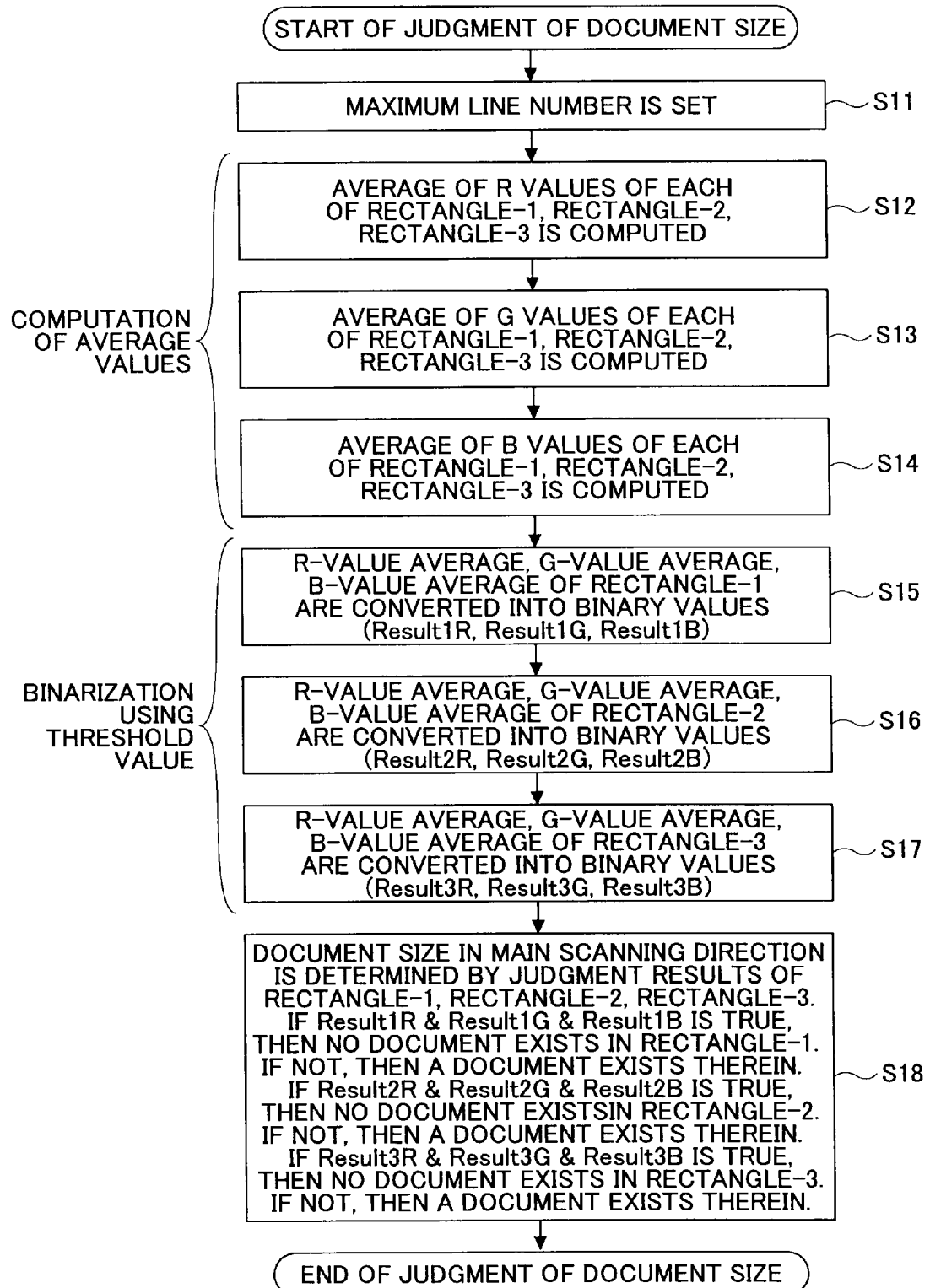
FIG. 15 is a flowchart for explaining the document detection processing which is performed by the image reading device of the embodiment of the invention.

FIG. 15 is a flowchart for explaining the flow of the averaging and binarization for document detection.

As shown in FIG. 15, the maximum number of the lines is set up (step S11), and thereafter, the averages of R, G, and B components of the image data of each rectangle region (patch) are computed (step S12-step S14).

Figure 17:
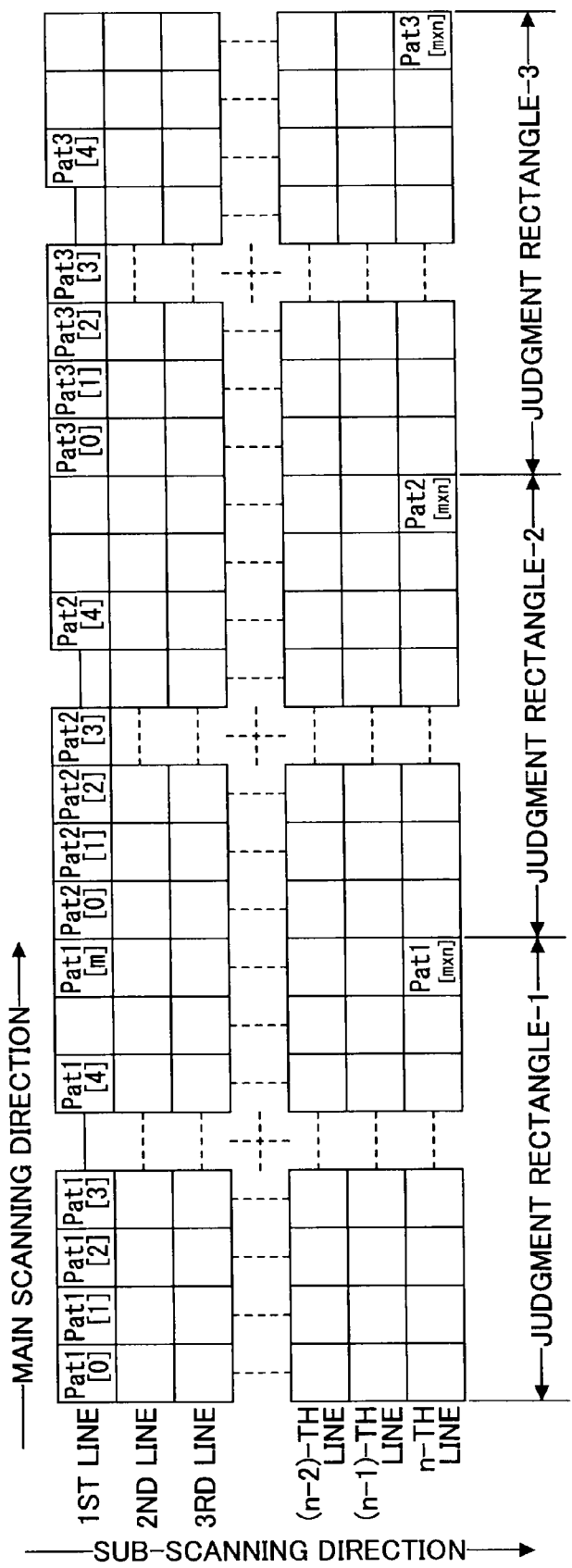
FIG. 17 is a diagram for explaining the document detection processing which is performed by the image reading device of the embodiment of the invention.

Next, the detailed processing of the averaging will be described. As shown in FIG. 17, the image data of the whole patch area are stored in the memory 43a of the document detection judgment processing unit 43. The document judgment processing unit 43b computes the average by summing all the pixels in the patch area.

For example, the average Pat1AveR of R of patch 1 is computed by the formula: Pat1AveR=(the sum of Pat1[0] through Pat1[m×n])/(m×n). Similarly, the average Pat1AveB of B of patch 1 and the average Pat1AveG of G of patch 1 are computed. In this embodiment, the image data is considered as follows. Namely, if the image data expressed by 8-bit data is 0, then the image is considered bright, and if the image data expressed by 8-bit data is 255, then the image is considered dark.

Referring back to FIG. 15, after computing the average of each rectangle region, binarization processing of the average will be performed for every component of R, G, and B (step S15-step S17).

The document size is judged as follows (step S18). Suppose that, in this example, a binarization threshold for document detection judgment (document size judgment) is set to PatTH. Moreover, suppose that the binarization threshold is common to each component: R, G, and B.

Alternatively, the binarization threshold may be changed when the detection ranges for the R, G and B components are changed respectively.

Moreover, suppose that the value of the binarization threshold is set beforehand to PatTH=32.

There is no reflected light in the area in which the document is not placed, and the read image data becomes dark. Accordingly, the judgment for the R component is performed as follows.

If PatTH≦Pat1AveR, Result1R is set to 1 (no document: primary judgment).

If PatTH>Pat1AveR, Result1R is set to 0 (a document exists: primary judgment).

Similarly, the judgment for the G and B components is also performed. Subsequently, the results of the binarization of the R, G and B components are set to Result1R, Result1B, and Result1G.

The results of binarization may differ by R, G, and B. Since the judgment based on only one of the components may cause an error, the final judgment is performed for the results of the three components in order to raise the accuracy of judgment. Namely, if the AND of the binarization results of R, G, and B of the judgment rectangle (patch) is truth (1), all the image data of R, G, and B are considered dark, and it is determined that there is no document. More specifically, the final judgment is performed as follows.

If Result1R & Result1B & Result1G is truth (1), it is determined that no document exists (final judgment).

If Result1R & Result1B & Result1G is false (0), it is determined that a document exists (final judgment).

The notation "&" denotes AND. Namely, the result of the AND of the binarization results is false (0) if there is at least one bright data exists among R, G, and B components, and it is determined in this case that a document exists.

Similarly, the above judgment is performed for the other rectangle regions (the patches 2 and 3). The document size of the main scanning direction is determined based on the results of the above judgment.

Although it is not illustrated, the detection of the document size of the sub-scanning direction may be performed using an APS (advanced photo system) sensor. Thereby, the document size of the sub-scanning direction can be determined similar to the detection of the document size of the main scanning direction.

Accordingly, the document size is finally judged by combining the result of the document size of the sub-scanning direction using the APS sensor and the result of the document size of the main scanning direction using the CCD described above.

Figure 18:
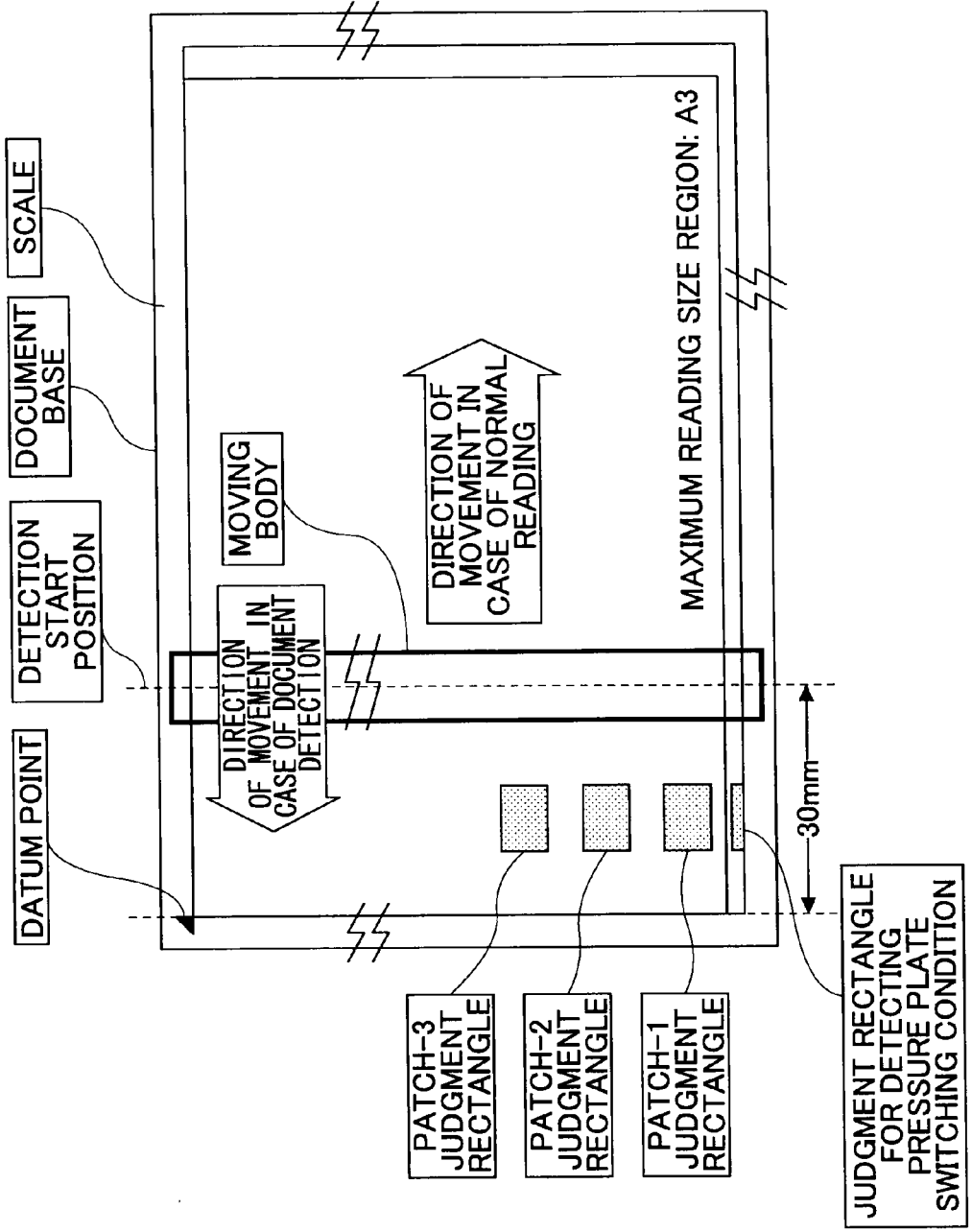
FIG. 18 is a diagram for explaining the document detection processing which is performed by the image reading device of the embodiment of the invention.

FIG. 18 shows the read positions used in a document detection processing (pressure plate opened/closed condition detection) which is performed by the image reading device of the embodiment of the invention.

Suppose that the maximum reading region in this example is set to the size of A3. In the example of FIG. 18, in addition to the three normal document detecting regions (rectangle regions for document size judgment), a judgment rectangle for detecting the pressure plate opened/closed condition is added, and this judgment rectangle is located outside the maximum reading area.

The timing of reading the judgment rectangle for detecting the pressure plate opened/closed condition is simultaneous with the timing of document detection reading.

Specifically, the document detection processing (the pressure plate opened/closed condition detection) is performed as follows. First, the average of image data within the judgment rectangle for detecting the pressure plate opened/closed condition is computed. The computation of this average is performed in a manner that is the same as the computation of image data in the document detection.

The computed averages of the respective components of the image data of the judgment rectangle for detecting the pressure plate opened/closed condition are set to StaAve1R, StaAve1G, and StaAve1B. A binarization threshold for judging the pressure plate opened/closed condition is set to StaTh1.

When the pressure plate is closed completely, the white image data is read from the back of the pressure plate. In this case, the average data is set to a value near 0.

In this embodiment, the image data is considered as follows. Namely, if the image data expressed by 8-bit data is 0, then the image is considered bright, and if the image data expressed by 8-bit data is 255, then the image is considered dark. Accordingly, the judgment for the R component of the image data is performed as follows.

If StaTh1≦StaAve1R, StaResult1R is set to 1 (it is primarily determined that the pressure plate is not closed completely).

If StaTh1>StaAve1R, StaResult1R is set to 0 (it is primarily determined that the pressure plate is closed completely).

Similarly, the computation and judgment for the other B and G components is performed. Subsequently, the final judgment is performed based on the results of the primary judgments for the three components R, G, and B as follows.

If StaResult1 (=StaResult1R & StaResult1G & StaResult1B) is truth (1), it is determined that the pressure plate is not closed completely (final judgment).

If StaResult1 (=StaResult1R & StaResult1G & StaResult1B) is false (0), it is determined that the pressure plate is closed completely (final judgment).

If the result of the final judgment indicates that the pressure plate is closed completely, the pressure plate is closed at the time of reading of the rectangles of document detection. In this case, there is a very high possibility that the detection of the document size of the main scanning direction is performed erroneously. Thus, a message indicating that erroneous detection of the document size has occurred is displayed on the display of the operation panel of the color MFP.

Next, a different-pattern document detection processing (pressure plate opened/closed condition detection) which is performed by the image reading device of the embodiment of the invention will be described.

Figure 19:
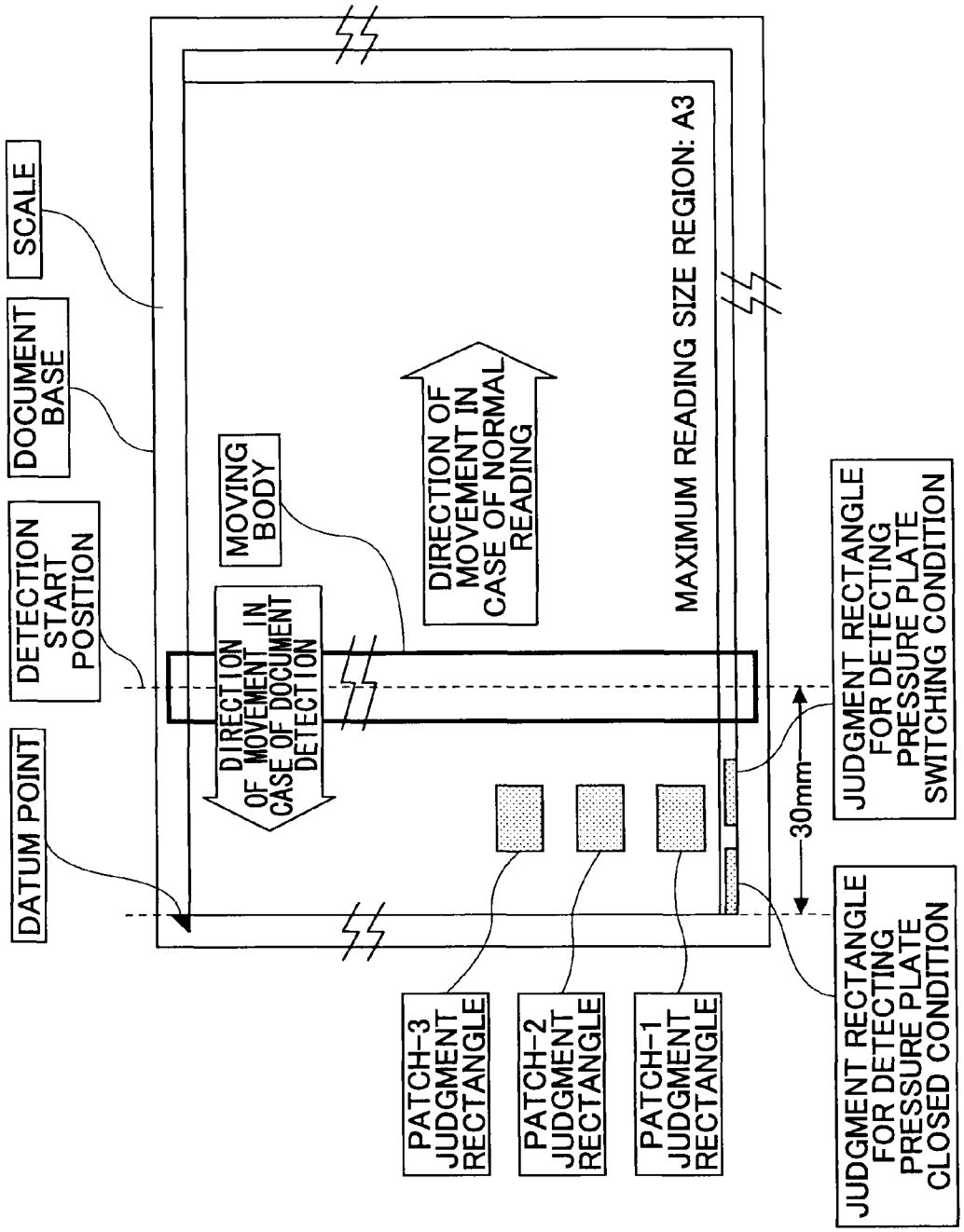
FIG. 19 is a diagram for explaining the document detection processing which is performed by the image reading device of the embodiment of the invention.

FIG. 19 shows the read positions used in the different-pattern document detection processing. In the example of FIG. 19, in addition to the three document detecting regions (the rectangle regions for judging the document size), two additional rectangle regions for detecting the pressure plate opened/closed condition are added, and these rectangle regions are located outside the maximum reading area.

One of them is a first judgment rectangle region (judgment rectangle for detecting pressure plate opened/closed condition) which is the same as in the previously described pressure plate opened/closed condition detection processing, and the other is a second judgment rectangle region (judgment rectangle for pressure plate closed detection) which is located adjacent to the first judgment rectangle region in the direction of movement at the time of document detection.

It is conceivable that the pressure plate is already closed, when the judgment rectangle for pressure plate closed detection is read. Thus, it is necessary in this case to perform document detection again by using a threshold other than the binarization threshold used for document detection.

First, the averaging and judgment of the rectangle regions for document size judgment and the rectangle regions for pressure plate opened/closed condition judgment is performed in the same manner as in the previously described detection processing. Moreover, the averaging of the judgment rectangle region for detecting pressure plate closed condition is also performed in the same manner.

Namely, the computed averages of the respective components of the judgment rectangle region for detecting pressure plate closed condition are set to StaAve2R, StaAve2G, and StaAve2B. A binarization threshold for detecting pressure plate opened condition is set to StaTh2.

When the pressure plate is closed completely, the white image data is read from the back of the pressure plate. In this case, the average data is set to a value near 0. When the reading is performed with the pressure plate in the opened condition and the start button is pressed, the result is that the pressure plate is not closed. The primary judgment of whether the reading is performed with the pressure plate in the opened condition is performed as follows.

If StaTh2≦StaAve2R, StaResult2R is set to 1 (the pressure plate is in the opened condition: primary judgment).

If StaTh2>StaAve2R, StaResult2R is set to 0 (the pressure plate is in the closed condition: primary judgment).

In this embodiment, the image data is considered as follows. Namely, if the image data expressed by 8-bit data is 0, then the image is considered bright, and if the image data expressed by 8-bit data is 255, then the image is considered dark.

Subsequently, the averaging and judgment for the B and G components is performed similarly. The result of the judgment for the B component is set to StaResult2B, and the result of the judgment for the G component is set to StaResult2G.

The final judgment is performed based on the results of the primary judgments for the three components R, G, and B as follows.

If StaResult2 (=StaResult2R & StaResult2G & StaResult2B) is truth (1), it is determined that the pressure plate is not closed completely (final judgment).

If StaResult2 (=StaResult2R & StaResult2G & StaResult2B) is false (0), it is determined that the pressure plate is not closed completely (final judgment).

If both StaResult1 and StaResult2 indicate the opened condition, it means that the reading start button is pressed while the pressure plate is opened. For this reason, the binarization threshold used at the time of document detection is changed between the case where the reading is started with the pressure plate in the opened condition and the case where the reading is started after the pressure plate is set in the closed condition, and the setting is changed as follows.

If StaResult (=StaResult1 & StaResult2) is truth (1), PatTh is set to 20 (which is the binarization threshold used for the case where the pressure plate is in the opened condition). In this case, the reading start button is pressed while the pressure plate is in the opened condition.

If StaResult (=StaResult1 & StaResult2) is false (0), PatTh is set to 32 (which is the binarization threshold used for the case where the pressure plate is not in the opened condition). In this case, the reading start button is pressed while the pressure plate is in the closed condition.

Subsequently, the document detection (document size judgment) is performed similar to the previously described method, by using the binarization threshold after the setting is changed.

In this manner, performance of the above document detection processing (the pressure plate opened/closed condition detection) enables the user to recognize a possibility that erroneous detection of the document size has occurred when the pressure plate is closed too early.

Figure 20:
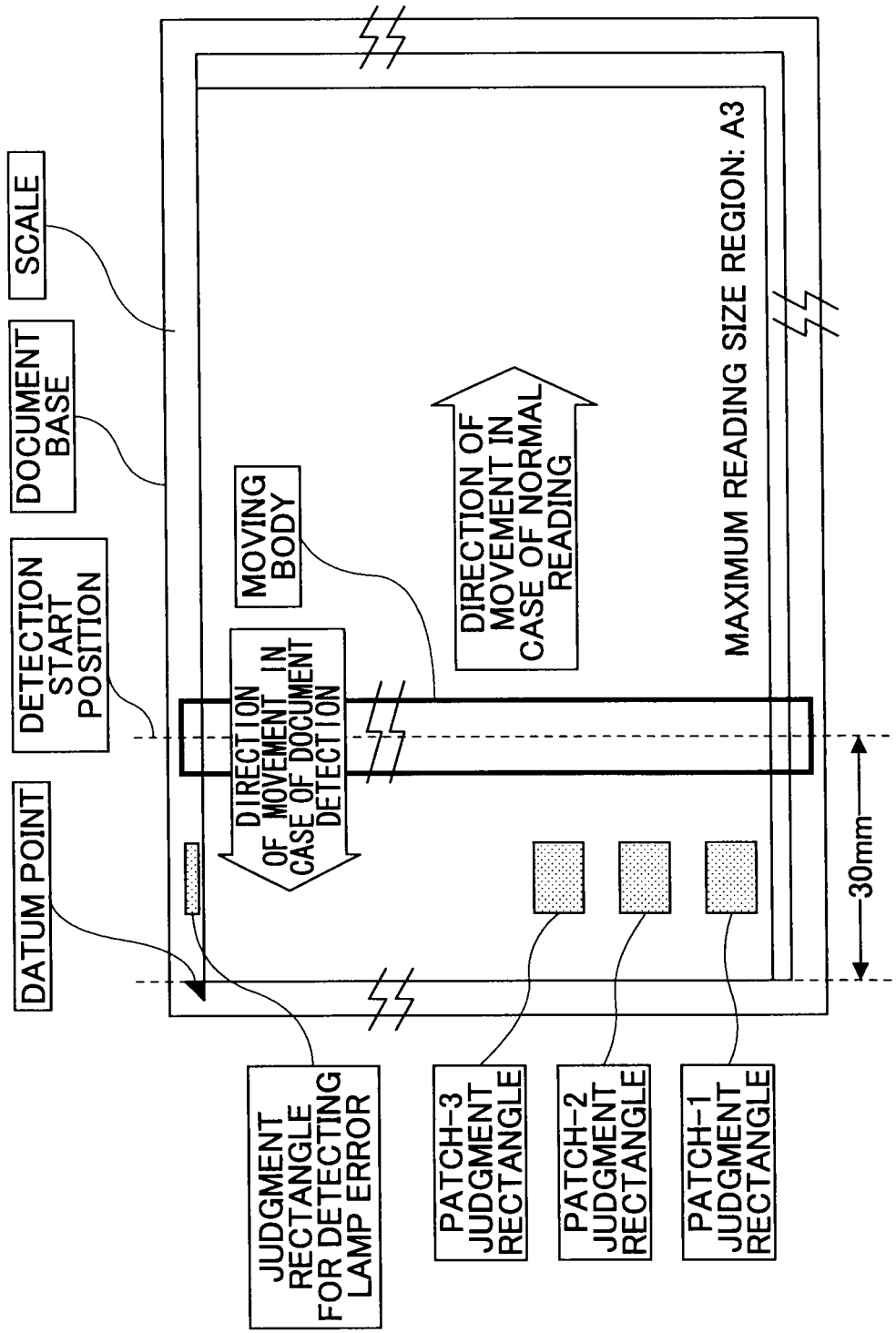
FIG. 20 is a diagram for explaining the document detection processing which is performed by the image reading device of the embodiment of the invention.

FIG. 20 shows the read positions used in another document detection processing (lamp error detection).

Suppose that the maximum reading region in this example is set to the size of A3. In the example of FIG. 20, in addition to the three normal document detecting regions (rectangle regions for document size judgment), a judgment rectangle for lamp error detection is added, and this judgment rectangle is located outside the maximum reading area.

As shown in FIG. 20, the judgment rectangle for lamp error detection is located on the back of the external portion or the sheet metal (scale) of the reading device isolated from the contact glass.

The timing of reading the judgment rectangle for lamp error detection is simultaneous with the timing of document detection reading.

Specifically, the document detection processing (lamp error detection) is performed as follows. First, the average of image data within the judgment rectangle for lamp error detection is computed. The computation of the average is performed in a manner that is the same as that in the document detection. The computed averages of the respective components of the image data of the judgment rectangle for lamp error detection are set to RamAve1R, RamAve1G, and RamAve1B.

It is necessary to measure the optical density of the back of the scale beforehand. Suppose that the optical density of the back of the scale in this example is expressed by a digital value of about 128. Moreover, suppose that the maximum of the threshold for lamp error detection is set to RamTh1H=100, and the minimum thereof is set to RamTh1L=200.

In this embodiment, the image data is considered as follows. Namely, if the image data expressed by 8-bit data is 0, then the image is considered bright, and if the image data expressed by 8-bit data is 255, then the image is considered dark. Accordingly, the judgment for the R component of the image data is performed as follows.

If RamTh1L<RamAve1R≦RamTh1H is truth (1), it is determined that the lamp is normal.

If RamTh1L<RamAve1R≦RamTh1H is false (0), it is determined that the lamp is error.

If the result of the above-mentioned judgment indicates that the lamp is error, it is possible that the document size of the main scanning direction is detected erroneously. Thus, a message indicating that erroneous detection of the document size has occurred is displayed on the display of the operation panel of the color MFP.

In this manner, the performance of the above document detection processing (lamp error detection) enables the user to recognize a possibility that the document size is detected erroneously, when the lamp is not turned on.

The pressure plate opened/closed condition detection and the lamp error detection as mentioned above may be performed concurrently with the time of performing the document size detection. In this case, in addition to the three normal document detecting regions (rectangle regions for document size judgment), either the judgment rectangle for pressure plate opened/closed detection (or the judgment rectangle for pressure plate closed detection) or the judgment rectangle for lamp error detection, located outside the maximum reading area, is added, and the averaging and judgment of these rectangle regions is performed as described above.

As described above, the performance of the first document detection processing (pressure plate opened/closed condition detection) and the second document detection processing (lamp error detection) enables the user to recognize a possibility that the document size is erroneously detected, when the pressure plate is closed too early, or when the lamp is not tuned on.

Figure 21:
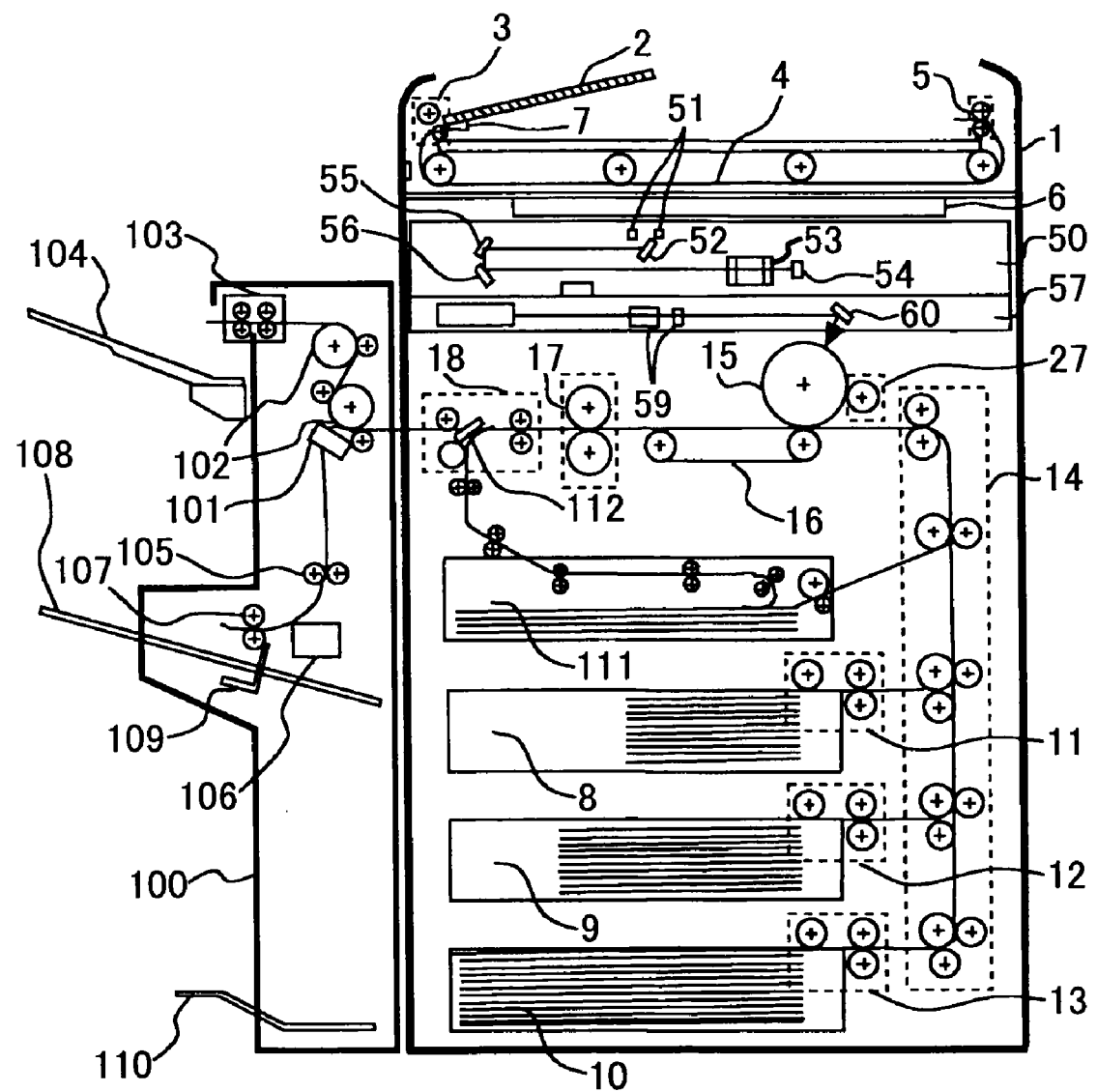
FIG. 21 is a diagram showing the outline composition of an image forming device in which an image reading device of an embodiment of the invention is provided.

FIG. 21 is a diagram showing the outline composition of the image forming device in which the image reading device of this embodiment is arranged.

The image forming device shown in FIG. 21 is a color MFP in which the image reading device of this embodiment is arranged, and this color MFP forms a toner image on a recording sheet through the known electrophotographic printing method.

As shown in FIG. 21, this image forming device includes: an image reading device 1 including an image reader 50, document transport devices 3, 4, 5, 7, and a document reading stand 6; a writing unit 57 including a laser output unit, a focusing lens 59 and a mirror 60; a first tray 8; a second tray 9; a third tray 10; a first feeding unit 11; a second feeding unit 12; a third feeding unit 13; a vertical transport unit 14; a transport belt 16; a photoconductor 15; a developing unit 27; a fixing unit 17; an ejection unit 18; and a post-processing device 100.

Next, the image forming operation of the image forming device of this embodiment will be explained.

When a start key on the operation panel is pressed, an uppermost document from a set of documents, placed on the document base 2 with their image surfaces up, is taken out and transported to a predetermined position on the document reading stand 6 (contact glass) by the feeding roller 3 and the feeding belt 4.

The document which is transported to the predetermined position on the document reading stand 6 (contact glass) is optically read by the image reader 50. After the reading of image data from the document is completed, the document is ejected through the feeding belt 4 and the ejection roller 5.

Subsequently, when it is detected by the document set detecting part that another document exists on the document base 2, the document is transported to the predetermined position on the document reading stand 6 (contact glass) similar to the above-mentioned operation. The feeding roller, the feeding belt, and the ejection roller are driven by the transport motor.

A recording sheet from among the recording sheets contained in one of the first tray 8, the second tray 9 and the third tray 10 is fed by one of the first feeder 11, the second feeder 12, and the third feeder 13, and the recording sheet is conveyed to a position which contacts the photoconductor 15 by the vertical transport unit 14.

The image data read by the image reader 50 is written to the surface of the photoconductor 15 by the laser beam from the writing unit 57, and an electrostatic latent image is formed on the surface of the photoconductor 15. The electrostatic latent image passes by the developing unit 27 so that the image is developed by toner, and a toner image is formed on the surface of the photoconductor 15.

The recording sheet sent by the vertical transport unit 14 is conveyed by the transport belt 16 which is rotated at the same speed as the rotational speed of the photoconductor 15, and the toner image formed on the photoconductor 15 at this time is transferred to the recording sheet. The recording sheet with the toner image transferred thereto is conveyed to the fixing unit 17.

The recording sheet on which the toner image is formed is conveyed by the fixing unit 17. In the fixing unit 17, the toner image formed on the recording sheet is heated and fixed onto the recording sheet.

The transport belt 16, the photoconductor 15, the developing unit 27, the fixing unit 17, and the ejection unit 18 are driven by the main motor (not illustrated).

The feed units 11-13 are driven through a feed clutch (not illustrated) to which the driving force of the main motor is transmitted. The vertical transport unit 14 is driven through a middle clutch (not illustrated) to which the driving force of the main motor is transmitted.

The ejection unit 18 ejects the recording sheet on which the image is formed to the post-processing device 100. The post-processing device 100 performs the post-processing, such as, punch processing, staple processing, copy-sheet arrangement processing, etc. on a document basis or on a copy sheet basis, the copy sheets being sorted using the image memory.

The present invention is not limited to the specifically disclosed embodiments, and variations and modifications may be made without departing from the scope of the present invention.

The present application is based on Japanese patent application No. 2007-280094, filed on Oct. 29, 2007, the contents of which are incorporated herein by reference in their entirety.

What is claimed is:

1. An image reading device comprising:
    a reading unit configured to scan first rectangle regions located within a maximum reading area equivalent to a maximum size of a document that can be scanned and acquire image data from the first rectangle regions;
    a transporting unit configured to move the reading unit to the first rectangle regions in a direction of movement opposite to a direction of movement in normal document reading;
    a document size judging unit configured to detect whether a document exists in each first rectangle region based on the image data acquired by the reading unit and a predetermined threshold, so that a size of the document is judged;
    a threshold switching unit configured to change a value of the predetermined threshold of the document size judging unit according to a result of judgment of a condition of a pressure plate which presses down a document on a document base, such that the value of the threshold is set to a first value when the pressure plate is judged as being in a closed condition, and the value of the threshold is set to a second value when the pressure plate is judged as being in an opened condition; and
    a pressure plate condition judging unit,
    wherein the reading unit is configured to scan second rectangle regions located outside the maximum reading area, the second rectangles being different from the first rectangle regions used by the document size judging unit, and to acquire image data from the second rectangle regions, and the pressure plate condition judging unit is configured to judge the opened or closed condition of the pressure plate, based on the image data of the second rectangle regions acquired by the reading unit, and
    wherein the reading unit is further configured to scan two rectangle regions located outside the maximum reading area and to acquire image data from the two rectangle regions, and the pressure plate condition judging unit is further configured to judge the opened or closed condition of the pressure plate based on the image data of the two rectangle regions acquired by the reading unit.

2. The image reading device according to claim 1, wherein the pressure plate condition judging unit is configured to perform binarization of the image data of the second rectangle regions acquired by the reading unit, and judge the opened or closed condition of the pressure plate by comparison of a resulting binary image data and a predetermined threshold.

3. The image reading device according to claim 1, further comprising a first warning unit configured to output, when it is judged by the pressure plate condition judging unit that the pressure plate is in an opened condition, to a user a warning message indicating that there is a possibility that the document size judged by the document size judging unit is not correct.

4. The image reading device according to claim 1, further comprising a lamp lighting condition determining unit configured to determine a lighting condition of a lamp illuminating a document, based on image data of the second rectangle regions acquired by the reading unit.

5. The image reading device according to claim 4, wherein the lamp lighting condition determining unit is configured to perform binarization of the image data of the second rectangle regions acquired by the reading unit, and determine whether the lamp is in a normal lighting condition by comparison of a resulting binary image data and a predetermined threshold.

6. The image reading device according to claim 4, further comprising a second warning unit configured to output, when it is determined by the lamp lighting condition determining unit that the lamp is not in the normal lighting condition, to a user a warning message indicating that there is a possibility that the document size judged by the document size judging unit is not correct.

7. An image forming device in which an image reading device is arranged, the image reading device comprising:
    a reading unit configured to scan first rectangle regions located within a maximum reading area equivalent to a maximum size of a document that can be scanned and acquire image data from the first rectangle regions;
    a transporting unit configured to move the reading unit to the first rectangle regions in a direction of movement opposite to a direction of movement in normal document reading;
    a document size judging unit configured to detect whether a document exists in each first rectangle region based on the image data acquired by the reading unit and a predetermined threshold, so that a size of the document is judged;
    a threshold switching unit configured to change a value of the predetermined threshold of the document size judging unit according to a result of judgment of a condition of a pressure plate which presses down a document on a document base, such that the value of the threshold is set to a first value when the pressure plate is judged as being in a closed condition, and the value of the threshold is set to a second value when the pressure plate is judged as being in an opened condition; and a pressure plate condition judging unit, wherein the reading unit is configured to scan second rectangle regions located outside the maximum reading area, the second rectangles being different from the first rectangle regions used by the document size judging unit, and to acquire image data from the second rectangle regions, and the pressure plate condition judging unit is configured to judge the opened or closed condition of the pressure plate, based on the image data of the second rectangle regions acquired by the reading unit, and wherein the reading unit is further configured to scan two rectangle regions located outside the maximum reading area and to acquire image data from the two rectangle regions, and the pressure plate condition judging unit is further configured to judge the opened or closed condition of the pressure plate based on the image data of the two rectangle regions acquired by the reading unit.

* * * * *